(12) United States Patent
Ruhland et al.

(10) Patent No.: US 11,513,595 B2
(45) Date of Patent: Nov. 29, 2022

(54) ELECTRONIC GLOVE WITH BARCODE SCANNER

(71) Applicant: NIMMSTA GmbH, Assling (DE)

(72) Inventors: Florian Ruhland, Erding (DE); Andreas Funkenhauser, Assling (DE)

(73) Assignee: NIMMSTA GmbH, Assling (DE)

( * ) Notice: Subject to any disclaimer, the term of this patent is extended or adjusted under 35 U.S.C. 154(b) by 0 days.

(21) Appl. No.: 16/793,287

(22) Filed: Feb. 18, 2020

(65) Prior Publication Data

US 2020/0305522 A1    Oct. 1, 2020

(30) Foreign Application Priority Data

Feb. 18, 2019 (DE) .......................... 202019000757.1

(51) Int. Cl.
| | | |
|---|---|---|
| *G06F 3/01* | (2006.01) | |
| *G06K 7/10* | (2006.01) | |
| *G06K 7/14* | (2006.01) | |

(52) U.S. Cl.
CPC ......... *G06F 3/014* (2013.01); *G06K 7/10891* (2013.01); *G06K 7/1413* (2013.01); *G06K 2007/10534* (2013.01)

(58) Field of Classification Search
CPC ..... G06K 7/10891; G06K 2007/10534; G06K 7/10881; A41D 19/0024; A41D 19/0027; A41D 19/0037; G06F 3/014
USPC ....................................... 235/462.44, 472.01
See application file for complete search history.

(56) References Cited

U.S. PATENT DOCUMENTS

| | | | | |
|---|---|---|---|---|
| 5,272,324 | A * | 12/1993 | Blevins .............. | G06K 7/10881 235/385 |
| 5,550,366 | A * | 8/1996 | Roustaei ............ | G06K 7/10891 235/455 |
| 6,156,985 | A * | 12/2000 | Chiang .................. | H01H 3/125 200/344 |
| 6,266,685 | B1 * | 7/2001 | Danielson ........... | G06F 15/0225 708/141 |
| 9,235,742 | B1 * | 1/2016 | Qaddoura ................. | G06T 3/60 |
| 9,900,061 | B1 * | 2/2018 | Lui .................. | G06K 19/06028 |
| 10,813,438 | B1 * | 10/2020 | Herman ................ | A61F 5/0118 |
| 2005/0001037 | A1 * | 1/2005 | Wulff .................... | G06F 1/1656 235/462.43 |

(Continued)

OTHER PUBLICATIONS

"Push-button". Oxford English Dictionary, second edition (1989). OED.com. Web. (Year: 2020).*

*Primary Examiner* — Suezu Ellis

(57) ABSTRACT

An electronic garment with a textile element, in particular a glove, a hand cover, a gauntlet or the like, with a first hook-and-loop fastener member firmly connected to the textile element and with an electronic unit comprising a reading unit for reading a code, wherein the electronic unit comprises a trigger that is electrically connected to the reading unit via an electric line, wherein the reading unit for reading the code starts upon actuation of the trigger, wherein the electronic unit comprises a second hook-and-loop fastener part, wherein, in a working position, a hook strip is firmly connected to a loop strip and thus, the electronic unit is firmly connected to the textile element, and wherein, in a pause position, the hook strip is detached from the loop strip and thus, the electronic unit is separated from the textile element.

17 Claims, 7 Drawing Sheets

(56) References Cited

U.S. PATENT DOCUMENTS

| | | | |
|---|---|---|---|
| 2009/0121026 A1* | 5/2009 | Druker | G06K 7/10891 235/462.44 |
| 2014/0158769 A1* | 6/2014 | Powell | G06K 7/10732 235/462.06 |
| 2016/0219202 A1* | 7/2016 | Barros | H04N 5/232935 |
| 2019/0213363 A1* | 7/2019 | Sugiura | G06K 7/109 |

* cited by examiner

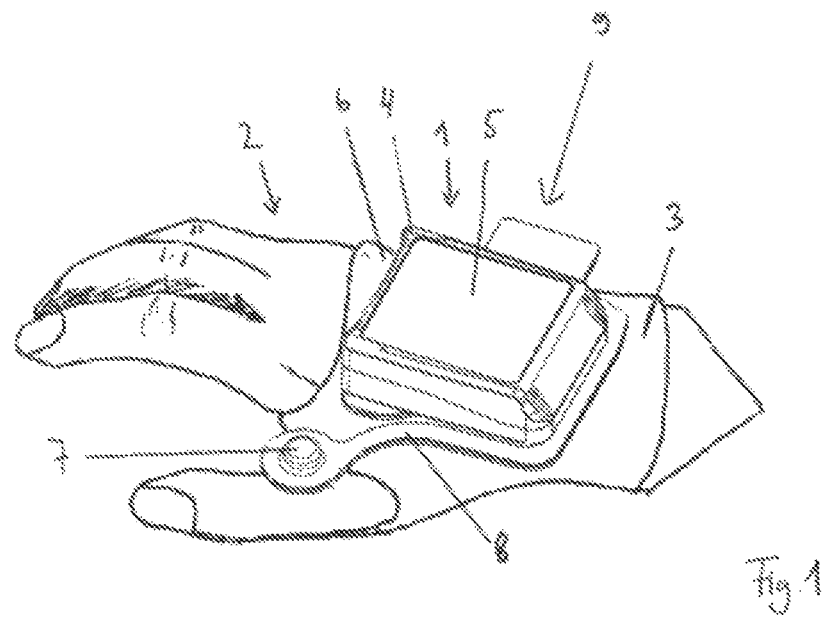
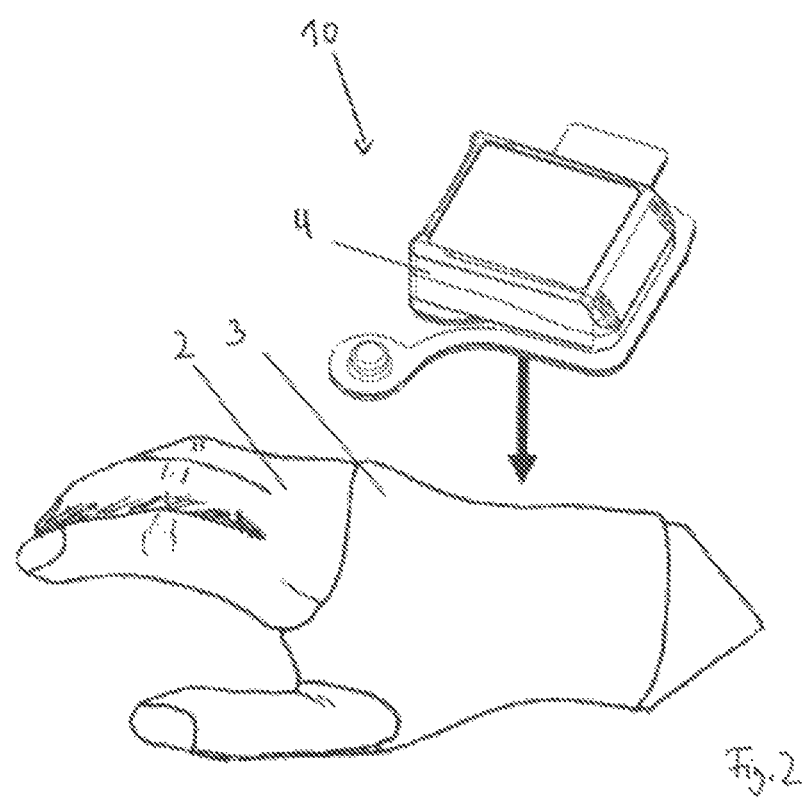

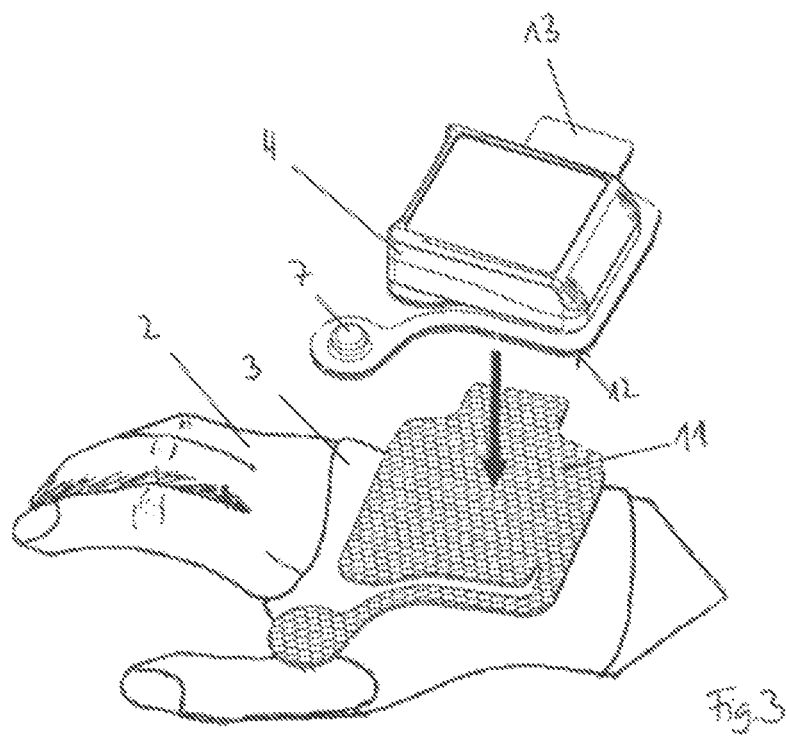
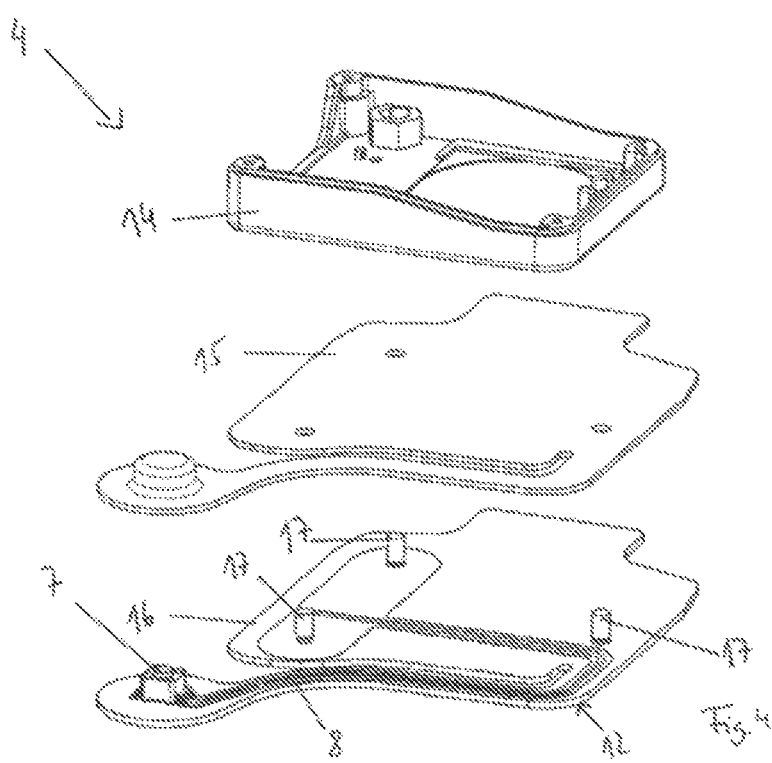

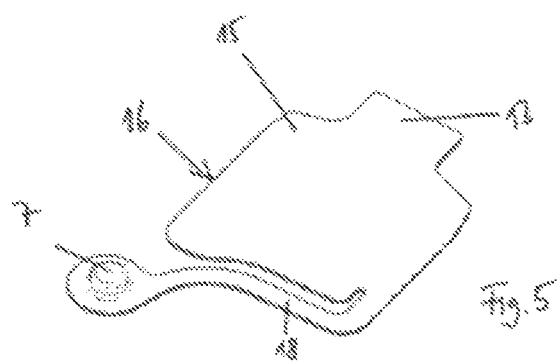
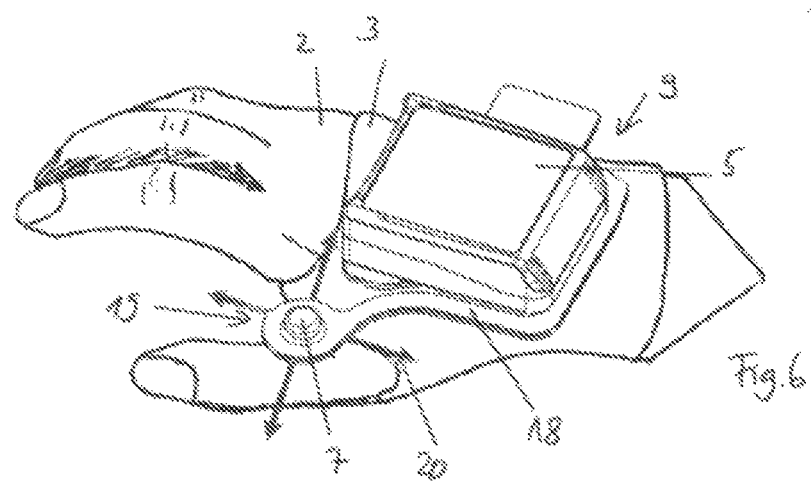

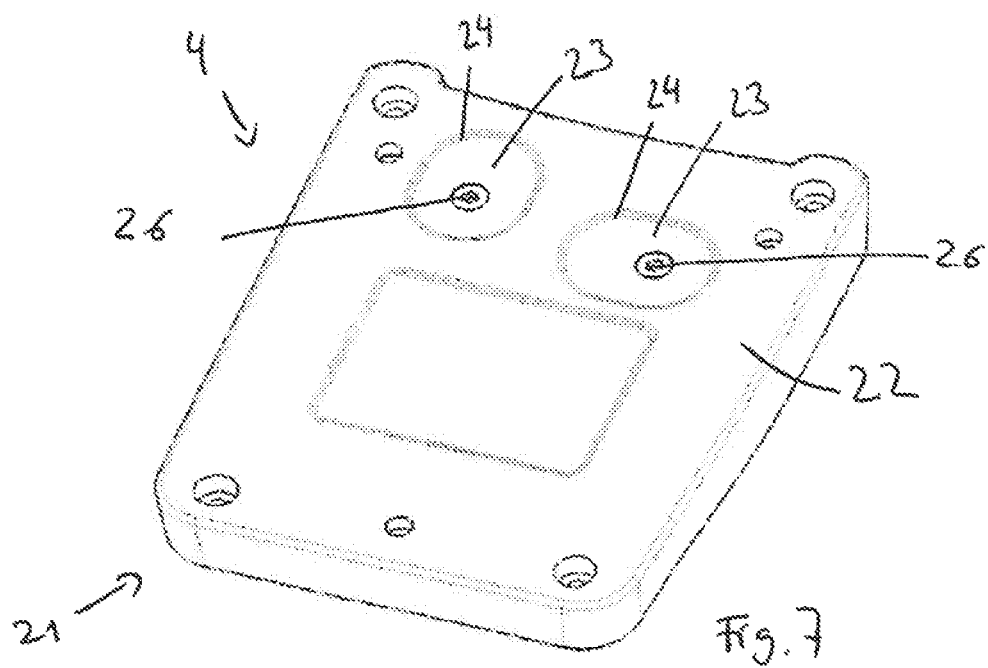
Fig. 7
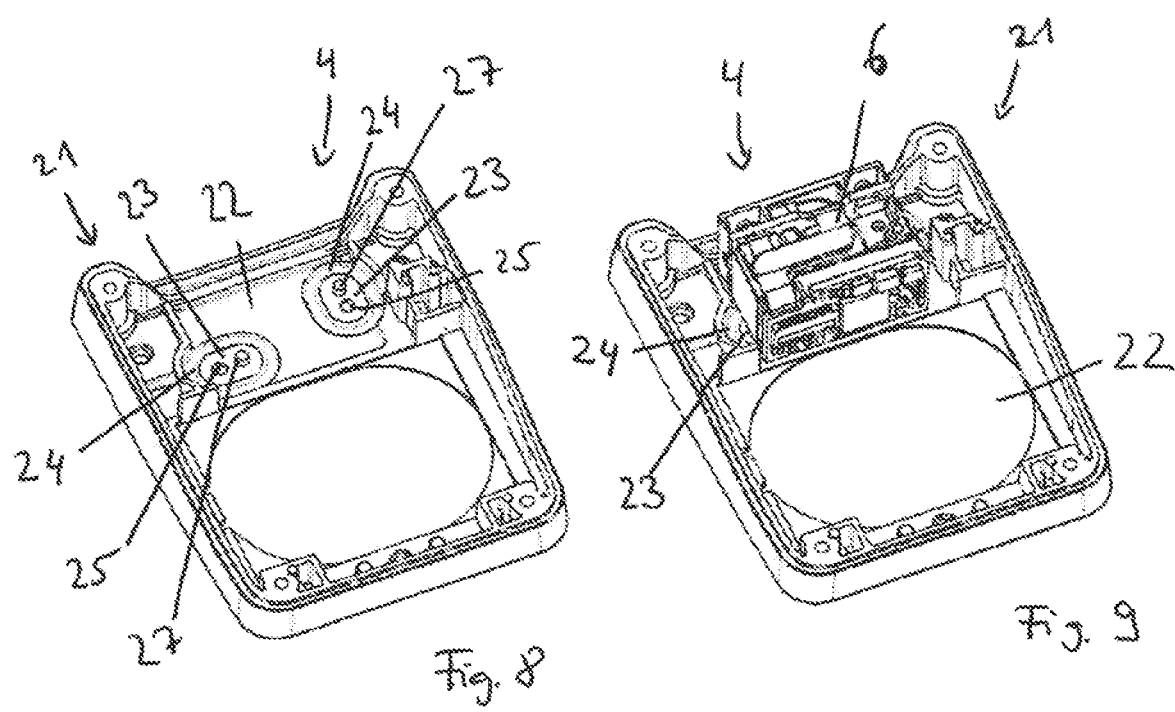
Fig. 8
Fig. 9

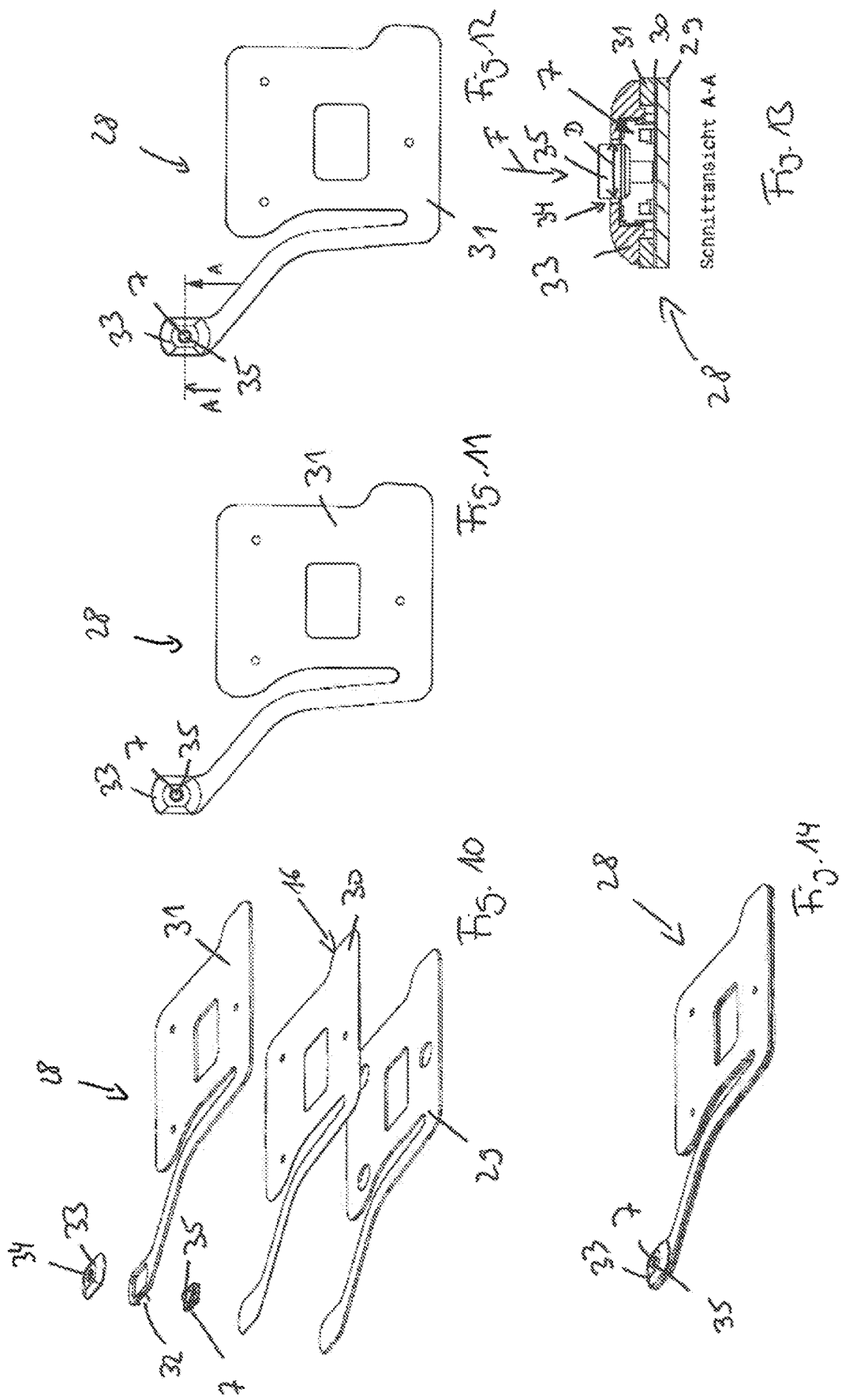

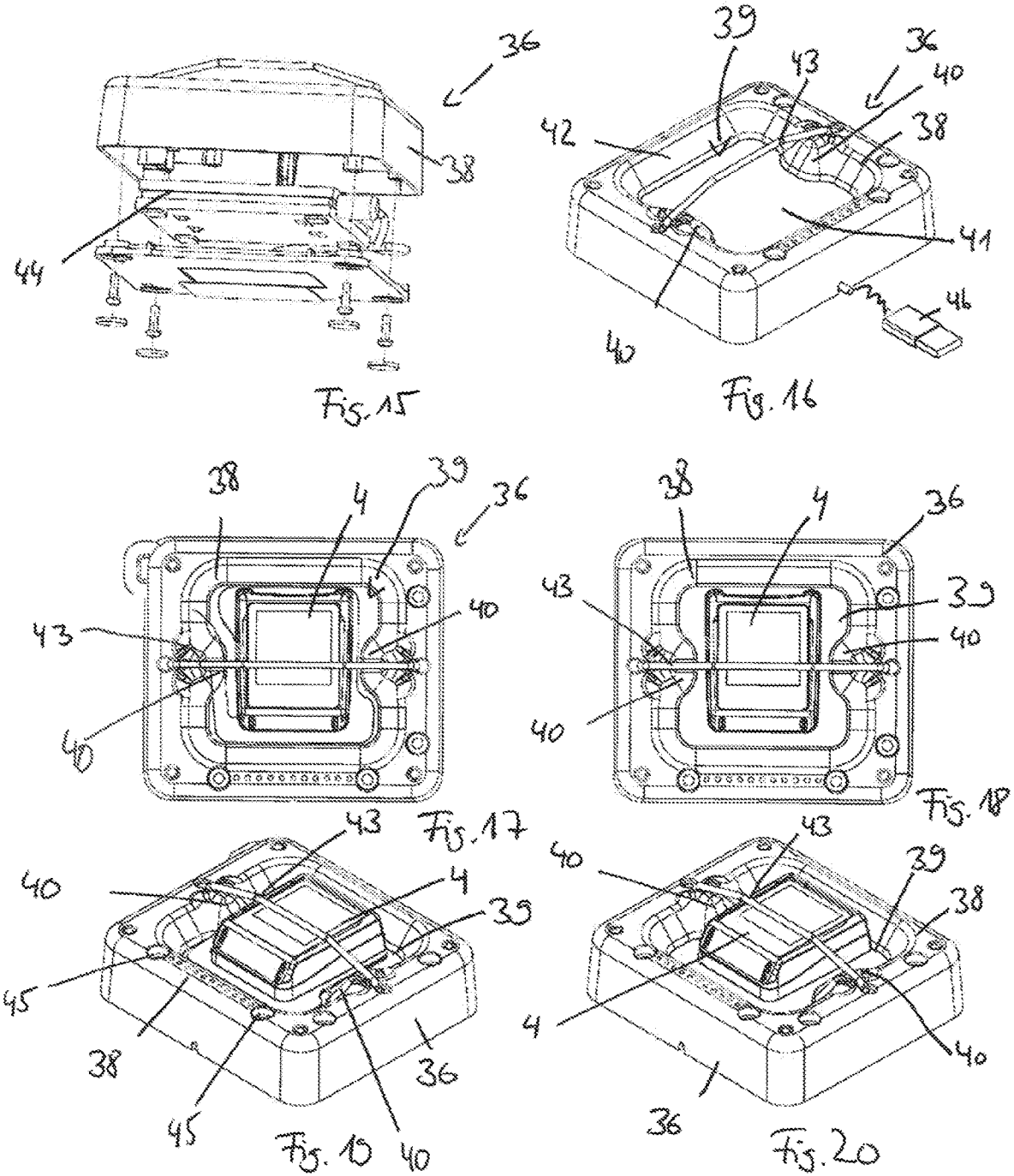

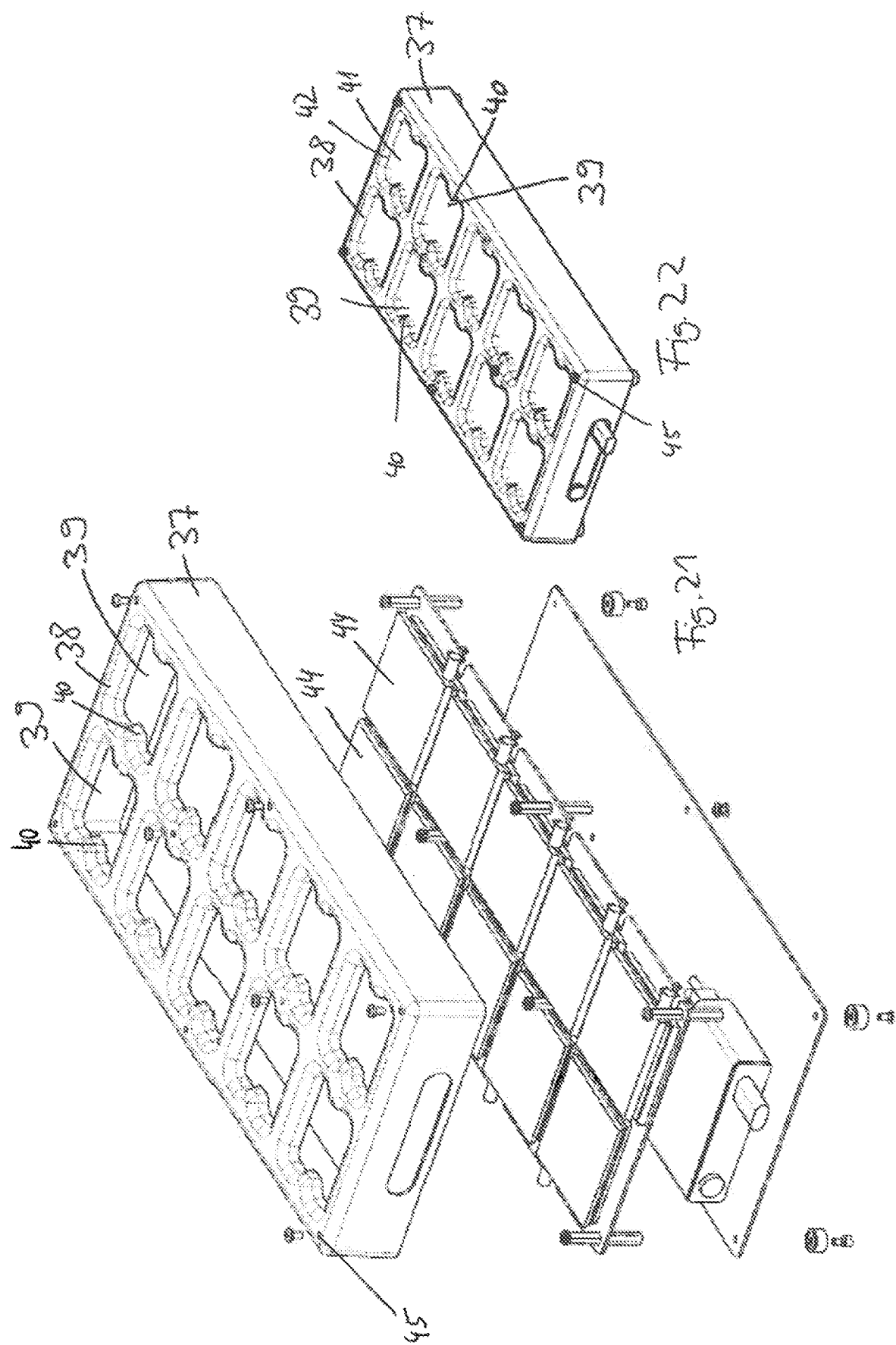

ELECTRONIC GLOVE WITH BARCODE SCANNER

The invention relates to an electronic garment with a textile element, in particular a glove, hand cover, gauntlet or the like, with an electronic unit for reading a code. The invention further relates to an electronic unit, which may, in particular, be a part of the electronic garment. The invention also relates to a charging station provided for charging the electronic unit of the electronic garment. Moreover, the invention relates to a textile element, which may, in particular, be a part of the electronic garment. Finally, the invention relates to a method for reading a code attached to a component by means of an electronic garment.

TECHNICAL BACKGROUND

Electronic garments, particularly gloves, with an electronic unit for reading a code are used, for example, in the production of motor vehicles in the automotive industry or in comparable logistics chains. A code is attached to a single component to be assembled, e.g. on a front apron. If the component to be assembled arrives at the line just in time, then the assembly worker, with his hand, holds the electronic garment, particularly the electronic unit, close to the code and reads the code. It is thus possible to check, for example, whether the component to be assembled fits the vehicle shell structure.

Due to their cumbersome structure, the electronic garments known from the prior art are uncomfortable to wear and/or awkward to operate. Moreover, the electronic garments known from the prior art are often difficult to clean.

THE UNDERLYING OBJECT

It is therefore an object of the invention to provide an electronic garment that is comfortable to wear, simple and convenient to operate, and easy to clean.

THE SOLUTION ACCORDING TO THE INVENTION

The object is achieved by an electronic garment having the features of any one of the independent claims.

The electronic garment comprises a textile element, in particular a glove, a hand cover, a gauntlet or the like, and a first hook-and-loop fastener member firmly connected to the textile element, preferably in the form of a loop strip. It further comprises an electronic unit. In this case, the electronic unit comprises a reading unit for reading a code. Furthermore, the electronic unit comprises a trigger, which can be operated arbitrarily by the user, generally by moving a finger, and which will often be configured as a button, particularly as a push button. For other cases, the configuration of the trigger as a light barrier or proximity sensor, preferably of the capacitive type, has proved useful. Preferably, the trigger is electrically connected to the reading unit via an electric line. The reading unit for reading the code starts upon actuation of the trigger.

Given all of the above, the electronic unit comprises a hook strip. In the working position, the hook strip is firmly connected to the loop strip, whereby the electronic unit is firmly connected to the textile element. In a pause position, the hook strip is reversibly detached from the loop strip. Thus, the electronic unit is separated from the textile element.

It is to be noted that the terms "hook strip" and "loop strip" are preferably understood in the sense of their narrower meaning. In that case, the hook strip consists of a number of individual hook-shaped structures, which are generally arranged in accordance with a regular pattern. If applicable, the loop strip consists of a plurality of outwardly protruding loops for fitting the hooks, which are preferably disposed in a random manner, but may otherwise also be positioned in a geometrically ordered pattern, e.g. in longitudinal and transverse rows of loops situated one behind the other or one next to the other.

If the terms "hook strip" and "loop strip" are understood in the sense of their broader meaning, which is also supposed to come under the scope of protection of the invention, then the "hook strip", for example, may also consist of "hooks" similar to, for example, mushroom heads. Equally, the sling strip may also, or instead, consist of such "hooks", for example, again similar to real hooks or mushroom heads—as long as a sufficiently firm, detachable and reproducible hook-and-loop connection can be produced between the hook strip and the loop strip. Most frequently, the loop strip will be connected to the textile element, and the hook strip to the electronic unit. This facilitates washing, because the textile element does not tend to become get caught, with its sling strip, in other items being washed, and primarily preserves the hook strip, which is more prone to be deformed or damaged if the glove etc. is used for work without having attached the electronic unit, which is often the case in practice.

Because the electronic unit is attached to the textile element by means of the hook strip and the loop strip, an individual, comfortable wear position of the electronic unit on the textile element can be chosen by the user. Thus, wearing the electronic garment is perceived as being very comfortable, on the whole, and the acceptance of the electronic garment by the user is improved decisively. Moreover, the electronic unit can be removed relatively quickly from the textile element. This means that an assembly worker, e.g. in the case of a working step in which the electronic unit is perceived as an encumbrance, is able to easily and quickly remove the electronic unit without having to take off the textile element. This facilitates and simplifies the work enormously and preserves the electronic unit. Otherwise, the latter is in danger of occasionally being exposed to greater stresses due to laziness, e.g. if the hand guiding the electronic unit has to carry out a hammer blow during the course of rougher assembly work in order to overcome jamming during assembly, and the worker in his haste neglects to completely remove the electronic garment as a precaution in advance.

This also applies, mutatis mutandis, if a worker, during assembly, has to access areas in which there is only little room for his hand.

Thus, the productive working performance of the assembly worker can be increased due to the rapid attachment and detachment of the electronic unit to or from the textile element.

In principle, assembly work is one area of use. Another area of use is logistics (large warehouses, parcel services, pickers).

Because of the separation of the electronic unit and the textile element, wherein the textile element, in particular, is free of any electronics, the textile element is also very easy to clean, e.g. in a washing machine. Thus, a hygienic use of the electronic garment can always be ensured.

PREFERRED DEVELOPMENTS OF THE INVENTION

Advantageously, the loop strip consists of a textile. As a result, the textile element including the loop strip can washed, and in addition, wearing comfort is increased. In particular, all of the textiles are at least partially, and advantageously completely, breathable.

Preferably, the loop strip and the textile element are sewn together. A firm connection between the loop strip and the textile element is thus ensured. Despite the firm connection of the loop strip and the textile element, sewing further ensures that the textile element adapts to the hand of the assembly worker. It may also be advantageous if the loop strip is attached, preferably sewn, to an arbitrary textile element, e.g. to a glove individually made by the assembly worker.

In some cases, it is particularly beneficial if the loop strip is glued or welded to the textile element (if necessary, additionally). In that case, the connection between the textile element and the loop strip is substantially a full-surface one, which favors the quick and forcible separation of the hook-and-loop fastener, even if that takes place in a casual manner and is therefore not done with particular care.

Expediently, the loop strip and the textile element are configured in an integral manner; in particular, the textile element is configured as a loop strip. As a result, the electronic member can be fastened to almost the entire textile element, which makes the attachment position of the electronic member very variable. Furthermore, the structure of the textile element is very simple as a result; optionally, even a single-use glove could be provided, which greatly improves hygiene.

When the textile element is worn on a hand of a user, the loop strip is disposed approximately in the region of the back of the hand. Particularly in the working position, when the textile element is worn, the electronic unit is disposed in the region of the back of the hand, most frequently between the knuckles and the wrist. As a result, the reading unit is convenient to operate and, if necessary, to read. Moreover, the hand, particularly the fingers, of the assembly worker remains capable of working in other working steps.

Preferably, the hook strip is disposed on a flexible circuit board, abbreviated PCB for the English term printed circuit board. For this purpose, the hook strip may be configured to be integral with the flexible circuit board in order to attain a particularly good production efficiency. A compact structure of the electronic unit is thus ensured. Otherwise, the PCB may also be accommodated in a type of "textile sheath" or "textile tube", which is preferably provided on its one side with the hook strip.

For some cases of use, it is expedient for the trigger to be a button, preferably a push button. It is mostly configured in such a way that it switches through when pressed down and returns to its interrupting position when it is released again. According to the invention, it can be positioned such— always outside the palm of the hand, which is to be kept free for gripping—that it can be operated by the thumb of the hand wearing the electronic garment. In this case, it is particularly advantageous if the button can be positioned variably. This means that it can be reversibly fixed in different positions by the user after having been detached previously. This makes it possible to adapt the unit exactly to different hand-anatomies. Furthermore, this makes it possible for one and the same user to slightly shift and reposition the button over the course of their working day—in order to prevent fatigue in this manner, if the button has to be pushed several 1000 times over the course of the working day. This requires a correspondingly configured and positioned hook-and-loop fastener or a correspondingly configured and attached covering consisting of a loop and a hook strip.

In this case, it is provided, in particular, that the button can be fixed in a region of the fingers, namely in the region of the side of the index finger or close to the base of the index finger. The connection or circuit board connection between the button and the unit has to be cut in such a way and sufficiently flexible to allow this.

In this case, buttons or push buttons are preferred because they are simple and reliable to operate. An erroneous activation is thus largely prevented. Expediently, the button is disposed on the circuit board. Expediently, the electric line leads from the button, particularly a push button, via the circuit board to a control device in the electronic unit. An electric line ensures a permanent and uninterrupted connection, so that it can be ensured that, when the button is triggered, the electrical signal is conducted via the circuit board to the control device of the electronic unit.

Advantageously, the electronic unit comprises a housing, a cover layer and the hook strip. Advantageously, the hook strip is glued to the cover layer. Advantageously, the hook strip is screwed to the housing. This provides for a simple but stable structure of the electronic unit.

Preferably, the hook strip comprises a tab provided for detaching the electronic unit from the textile unit. The assembly worker is able to grasp the tab and remove the electronic unit from the textile element with it.

Expediently, the tab is free of hooks. Thus, the tab protrudes slightly from the textile element, whereby the assembly worker is able to easily and quickly grasp the tab.

Advantageously, the button, in particular the push button, is disposed at a target position in the region of the back of the hand, preferably in the region between the index finger and the thumb—often in such a way that it can be operated by laterally pressing together the thumb and the index finger.

Ideally, the trigger or button, in particular the push button, can be attached to the textile element in a variable operating position, wherein the operating position is located within a range of approximately +/−8 mm from the target position on the textile element.

In particular, the position of the push button can be adapted individually, e.g. to small or large hand sizes.

Preferably, the reading unit includes a barcode scanner.

More preferably, the reading unit includes an RFID scanner or ideally both.

Expediently, the electronic unit includes a display for displaying information, e.g. for displaying a successful or unsuccessful scanning process, for displaying the scanned product or the like. It is thus possible for the assembly worker to visually check, directly and quickly, whether the scanning process was successful or whether the component fits the next vehicle shell structure.

Expediently, the electronic unit comprises an acoustic signal unit which, in particular, outputs a confirmation tone in the case of a positive scanning process, and which outputs a warning tone in the case of a negative scanning process, wherein the confirmation tone acoustically differs from the warning tone. Particularly preferably, the display is a touch-screen. Such a touchscreen enables the operator also to carry out other tasks in a particularly simple manner, such as cancelling an erroneous or inadvertent recognition, or for inputting additional information, such as (e.g. in the automotive sector) to the effect that the mounted part requires reworking because the supplied front apron, for example, has a slight scratch and re-polishing is required on the vehicle at a later point in time. If used in the logistics sector, a stock shortage can be registered in this manner.

Instead or in addition to the acoustic signal unit, a vibro-signal unit may ideally be provided, i.e. a vibrator or vibrating motor which is briefly switched on to signal something, and which then provides a haptic feedback.

Advantageously, the electronic unit includes a radio communications module, with which a Bluetooth connection or other ISM or SRD connection (e.g. via one of the standards such as ZigBee, ZWave or Open Interconnect Consortium) can be established with an external workstation. Ideally, one of the very operationally reliable and license-free frequency bands with 868 MHz or 915 MHz is used. Thus, information between the electronic unit and the workstation can be exchanged. In particular, the electronic unit is able to access the databases stored in the workstation. In particular, the electronic unit is able to supply the databases stored in the workstation with data; for example, the electronic unit can send to the workstation the information as to which component was scanned.

Expediently, the electronic unit is configured in the shape of a smart watch, even if it is worn back of the hand.

Advantageously, the textile element is configured to be free of electronics. As a result, the textile element is easy and inexpensive to produce. Furthermore, the textile element is easy to wash. If necessary, the textile element may be removed after use, for example for hygienic reasons, without expensive electronics having to be replaced.

Alternatively, the above-mentioned object is achieved by an electronic unit, particularly as a component of the electronic garment according to any one of the claims 1 to 25, with a reading unit for reading a code. In this case, the electronic unit comprises a trigger. The trigger is electrically connected to the reading unit via an electric line, wherein the reading unit for reading the code starts upon actuation of the trigger. The electronic unit comprises a second hook-and-loop fastener part, preferably in the shape of a hook strip. In this case, the second hook-and-loop fastener part can be connected via a first hook-and-loop member, preferably in the form of a loop strip, which is firmly connected to a textile element, in particular a glove, hand cover, gauntlet or the like. In a working position, the hook strip can thus be firmly connected to the loop strip, and as a result, the electronic unit can be firmly connected to the textile element. Consequently, the hook strip can be detached from the loop strip in a pause position, and the electronic unit can thus be separated from the textile element.

Advantageously, the reading unit comprises a photo cell unit and a scanning unit, wherein the scanning unit is provided for scanning the surroundings, particularly the code, and wherein the photo cell unit photographs the code for further electronic processing. Thus, the component to be mounted can be scanned quickly and easily, in particular in a contactless manner.

Preferably, the electronic unit made, in particular, from plastic, comprises a housing, wherein the reading unit is disposed, in particular, within the housing, and wherein the housing comprises a bottom. In this case, the reading unit is firmly connected to a contact surface disposed on the bottom of the housing. At the same time, the contact surface is mounted on the bottom in a floating and/or resilient manner. This prevents, or prevents to a large extent, the reading unit from being damaged in the event of the electronic unit falling down and thus hitting the floor hard. As a consequence of the floating or resilient mounting of the reading unit, the impact on the floor is cushioned for the reading unit so that acceleration forces arise only to such an extent that the reading unit is advantageously capable of enduring them without suffering any damage yet. In particular, the drop height is as large as it occurs in the case of a use as intended, i.e. approximately the height of a man. Expediently, greater heights may also be withstood without any damage; such as if the electronic unit falls down one story, i.e. up to about 10 m, for example, expediently up to about 5 m.

Expediently, the contact surface and the bottom are configured integrally. A simple and quick production is thus enabled.

Advantageously, the bottom and the contact surface are connected to each other via a wall, in particular in an integral manner. Advantageously, the wall thickness of the wall is thinner than the wall thickness of the bottom, and thinner than the wall thickness of the contact surface, so that the wall surface enables the floating and/or resilient mounting of the contact surface on the bottom. Preferably, the wall encloses the contact surface completely. In particular, the wall surrounds the contact surface in an oval, circular, elliptical or similar shape. This enables a simple but very effective floating/resilient mounting.

Expediently, the contact surface is offset from the outer side of the bottom, wherein the outer side of the bottom is the side disposed on the outer side of the housing. Thus, the contact surface is capable of being resilient even if the underside of the electronic unit hits the floor flat, and if therefore, not every surface that does not spring back would hit the floor "flush".

Advantageously, the reading unit firmly connected to the contact surface is mounted without any contact with the bottom. Expediently, a distance is realized in this case between the bottom and the reading unit, particularly a distance of at least about 0.1 mm, preferably at least about 0.2 m, and in particular at most about 1 mm, preferably at most about 0.5 mm. This prevents the reading unit from bouncing through to the extent that it hits the housing bottom in the event of an impact of the electronic unit. Accordingly, there is enough clearance for the reading unit to be able to bounce through.

Preferably, a bore is provided in the contact surface, wherein the bore connects the outer side of the housing with the inside of the housing. Thus, the reading unit can be firmly screwed to the contact surface by means of a fastening screw led through the bore. Preferably, the contact surface has a positioning pin protruding into the interior of the housing. The positioning pin, which is in particular configured as a dowel pin, positions the reading unit on the contact surface. As a result, the reading unit can be quickly and simply positioned properly during assembly, i.e. attached in the intended position.

Advantageously, the electronic unit comprises an at least triple-layered button pad. A lower layer of the button pad comprises or forms the hook strip. A middle layer of the button pad comprises or forms a flexible circuit board electrically connected to the trigger. In this case, an upper layer, particularly a cover layer, of the button pad seals the button pad. As a rule, the middle layer is disposed between the lower layer and the cover layer.

Advantageously, the cover layer has a cut-out for the trigger. Most frequently, a cap having a housing-like depression is disposed above the cut-out of the cover layer. The trigger is disposed in the housing-like depression, particularly in such a way that the trigger is enclosed, largely or substantially completely, by at least the lower layer, the cover layer and the cap. Expediently, the cap is configured in a shell-like manner. This is the case, for example, if the material of the cap is chosen to be so rigid and thick that the cap cannot be compressed by more than 0.15 mm in the direction of the housing interior formed by it, even if the maximum forces to be expected in operation are doubled. Thus, the trigger is securely and firmly integrated into the button pad. In particular, the trigger is largely protected from mechanical impacts by the cap, in particular shell cap.

Preferably, the cap has a, in particular central, bore disposed on the outer side of the cap facing away from the cover layer. In this case, a button of the trigger protrudes from the bore, so that the user can actuate the button of the trigger. Preferably, the cap is configured in a massive, in particular shock-resistant, manner.

Expediently, the cap is glued to the cover layer. Expediently, the lower layer is glued to the middle layer and/or the middle layer to the upper layer. The individual layers are connected to each other in a simple and at the same time firm, and in particular partially also flexible, manner by gluing. Expediently, the adhesive includes cyanoacrylate, in particular ethyl cyanoacrylate, and is of the type LOCTITE® 480™, for example.

Advantageously, the actuation of the trigger requires an actuating force of no more than about 10 N, in particular no more than about 5 N, particularly advantageously of no more than about 3.5 N. Advantageously, the trigger has a key travel of about 1 mm at most, preferably about 0.5 mm at most, particularly preferably about 0.3 mm at most. As a result, the trigger can be actuated by a user many thousands of times per day, without any fatigue being experienced by the user, particularly with regard to the user's thumb. At the same time, it is ensured that an inadvertent erroneous activation does not take place.

Preferably, the trigger can be actuated at least about 10,000 times, in particular at least about 100,000 times, preferably at least about 1,000,000 times, particularly preferably at least about 2,000,000 times. A long life span or life of the trigger is thus ensured.

Expediently, the trigger comprises an, in particular round, actuating button, wherein the actuating button has a diameter of at most about 6 mm, preferably of at most about 5 mm, particularly preferably of at most about 4 mm. Expediently, the design of the trigger matches that of the types Panasonic EVQP0, EVQQ2, EVQ6Q2 or EVQ7Q2.

Alternatively, this object mentioned above is achieved by a charging station for an electronic unit according to any one of the claims 6 to 11 and/or for an electronic unit of an electronic garment according to any one of the claims 1 to 5. It is characterized in that the charging station comprises a charging housing, wherein the charging housing comprises a charging bay provided for receiving the electronic unit.

Advantageously, the charging housing has at least one centering projection for positioning the electronic unit in the charging bay. Advantageously, the centering projection protrudes into the charging bay and is configured, in particular, in a lug-like manner. As a rule, the charging bay comprises a charging bottom and charging walls, wherein the centering projection is in that case disposed on one of the charging walls. Expediently, all the edges, particularly the edges of the charging walls, are rounded. This design is advantageous in that the electronic unit can be inserted into the charging station very rapidly by the user and is centered therein at the same time, so that the electronic unit is charged. The speed is particularly important in this case, because the assembly times are often short and a rapid and reliable charging is required in this case.

Ideally, the charging station comprises a fastening device for fastening the electronic unit. In particular, the fastening device is configured as a bracket, particularly as a folding bracket, or as a tension belt, in particular as a rubber band, spring pressure clip or the like. It is thus ensured that the electronic unit is situated close to and firmly on the charging station, particularly without an air gap, so that charging, in particular inductive charging, works optimally. Furthermore, the charging station may, for example, be attached to the wall therewith, and the electronic unit retained in the charging station is reliably held against the action of gravity and does not drop out.

Expediently, the charging station includes devices for inductively charging the electronic unit. Thus, exposed electrical points of contact that are susceptible to corrosion and/or dirt are not necessary. Thus, charging is particularly reliable.

It is particularly beneficial if the charging station comprises at least one connecting device with which the charging station can be connected, in particular firmly connected, to a second charging station, which is, in particular, identical in construction. As a result, several individual charging station can be combined. Optionally, the individual charging stations can also be attached, particularly by means of screws, to a holder such as a board, a metal sheet or the like, preferably several charging stations one next to the other.

Preferably, the charging station has several, in particular at least about 2, preferably at least about 6, particularly preferably at least about 10, and in particular at most about 50, preferably at most about 20, particularly preferably at most about 16 charging bays.

Alternatively, the object mentioned in the introduction is achieved by a textile element, in particular in the shape of a glove, a hand cover, a gauntlet or the like, with a first hook-and-loop fastener member firmly connected to the textile element, preferably in the form of a loop strip. Thus, an electronic unit can be connected via a second hook-and-loop fastener part, preferably in the shape of a hook strip, which is attached thereto, to the textile element. In this case, the hook strip can be firmly connected to the loop strip in a working position. Thus, the electronic unit can also be firmly connected to the textile element. In a pause position, the hook strip is detachable from the loop strip. Thus, the electronic unit can be separated from the textile element. In this case, the electronic unit comprises, in particular, a reading unit for reading a code. Also, the electronic unit comprises, in particular, a trigger, which is electrically connected to the reading unit, particularly via an electric line. The actuation of the trigger, in particular, starts the reading unit for reading the code.

Alternatively, the object mentioned in the introduction is achieved by a method for reading a code attached to a component by means of an electronic garment according to any one of the claims 1 to 5, comprising the following method steps:

a) Donning the textile element by a user,
b) Connecting the electronic unit to the textile element, in particular firmly connecting the first to the second hook-and-loop fastener part, so that the electronic garment can be used in the working position by the user,
c) Preferably independent thereof, arranging the trigger in the operating position thereof, which can be reached with a finger in an optimum manner, and subsequent connection to the textile element,
d) Reading the at least one reading code of the at least one component, wherein the user actuates the trigger and thus, the reading unit reads the code, e) If necessary, repeating the method step c) once or several times, particularly when scanning codes of several components, f) Detaching the electronic unit from the textile element, so that in the pause position, the user is capable of working, in particular without the electronic unit.

Preferably, the user repeats the working steps b) to e) after the working step e), in particular once or several times. The user is thus able to scan several components. Alternatively, the user may also continue to work without scanning.

After the working step e), the user advantageously takes off the electronic unit for charging the electronic unit in a charging station according to any one of the claim 12 or 13. As a result, has his hands free—except for the textile unit—and is able to work well. In particular, the user need not fear any damage to the electronic unit and/or the component when working. At the same time, the user is also able to reach into narrow gaps without the electronic unit compromising the accessibility of narrow gaps.

Other features and advantages of the invention become apparent from the following description of at least one exemplary embodiment and from the attached drawings, to which reference will be made in the description. In the drawings:

LIST OF FIGURES

FIG. 1: shows an oblique view of an electronic garment worn by a user in a working position, FIG. 2: shows an oblique view of the electronic garment worn by the user in a pause position, FIG. 3: shows an oblique view of the electronic garment worn by the user in a pause position, wherein a textile element and a loop strip are depicted individually for illustration purposes, FIG. 4: shows an electronic unit in a schematic exploded view, FIG. 5: shows an oblique view of a flexible circuit board with a cover layer, FIG. 6: shows an oblique view of the electronic garment worn by the user in a working position, with a schematic illustration of the options for positioning the button, FIG. 7: shows a bottom view of a housing portion of the electronic unit, FIG. 8: shows an internal view of the housing portion of the electronic unit, FIG. 9: shows an internal view of the housing portion of the electronic unit, with a mounted reading unit, FIG. 10: shows a schematic exploded view of a button pad, FIGS. 11 and 12 show a top view of the button pad, FIG. 13: shows a detailed view of the button pad in a cross section along the cut A-A according to FIG. 12, FIG. 14: shows a perspective view of the button pad, FIG. 15: shows an exploded view of a charging station, FIG. 16: shows a perspective view of the charging station, FIGS. 17 and 18: show a top view of the charging station with the electronic unit placed therein, FIGS. 19 and 20: show a perspective view of the charging station with the electronic unit placed therein, FIG. 21: shows an exploded view of a further embodiment of a charging station with several charging bays, and FIG. 22: shows a perspective view of the further embodiment of the charging station with several charging bays.

EXEMPLARY EMBODIMENT

FIG. 1 shows an electronic garment 1. The electronic garment 1 is worn by a user 2, wherein only the hand of the user 2 is shown in FIG. 1.

The electronic garment 1 comprises a textile element 3. As a rule, the textile element 3 is a glove, a hand cover, a gauntlet or the like. When worn, the textile element 3 encloses the back of the hand including the knuckles and the wrist. The fingers and the thumb are not enclosed by the textile element 3. Ideally, the textile element is the fingerless glove show herein, with a common outlet for the four main fingers and a separate outlet for the thumb.

In another exemplary embodiment, the fingers and/or the thumb may be enclosed by the textile element 3.

The textile element 3 consists of a textile, e.g. of a natural fabric, e.g. cotton, or an artificially produced one, e.g. nylon.

In one exemplary embodiment, the textile element comprises no electric or electronic components, i.e. is configured to be free of electronics.

The electronic garment 1 shown in FIG. 1 comprises an electronic unit 4. The electronic unit 4 comprises a reading unit 6 not shown in the Figures. The reading unit 6 is provided for reading a code. In the exemplary embodiment, the reading unit 6 is a scanner for scanning a barcode. This reading unit 6 may also be configured as a scanner for scanning an RFID chip. The reading unit 6 may also comprise several scanners, e.g. a scanner for reading a barcode and a scanner for reading an RFID chip.

In the exemplary embodiment of FIG. 1, the reading unit 6 is arranged in such a way that the scanning beam emitted by the scanner runs above the fingers, approximately parallel to the back of the hand. As a result, the user 2 is able to comfortably scan a code disposed in front of the user.

Typically, the barcode and/or the RFID chip are attached to components not shown in the Figures, which are typically mounted in a production line for producing an end product. In the exemplary embodiment, the end product is a motor vehicle and a component, e.g. a front apron, wherein the front apron is provided with the barcode and/or the RFID chip. If the component arrives at the production line just in time, the user 2, i.e. an assembly worker in this case, can scan the component with the reading unit 6 prior to assembly. As a result, it is electronically registered which component is mounted on the vehicle to be produced.

Furthermore, the electronic unit comprises a display 5, also referred to as a screen, which is configured as a touchscreen in the exemplary embodiment. The touchscreen serves for inputting information, in particular for inputting standardized processes or the like. Information may be displayed on the display 5, for instance the information about which component needs to be mounted, was mounted and/or whether the correct component was mounted; displaying a successful or unsuccessful scanning process is possible, or the confirming display of the scanned product or the like. The display 5 may also show which component has to be mounted next, i.e. which component needs to be scanned next.

Also, the information about the next job can be displayed to a logistics worker using the device according to the invention, such as the aisle, compartment, location, article and number of items. As a result, the worker does not have to go to the forklift terminal for the next picking process, nor look at the display of the mobile phone or handheld.

As an alternative or addition to the display 5, a tone generator may be provided. For example, the tone generator can acoustically confirm the correct scanning of the component with a confirmation tone. For example, the tone generator may also confirm an incorrect scanning with a warning tone, with the warning tone differing from the confirmation tone. For example, the tone generator may also confirm the scanning of a wrong component, e.g. a front apron in the wrong color, with a signal tone, with the signal tone differing from the warning tone and the confirmation tone.

The electronic unit 4 includes a trigger, which in this case is configured in the form of a button 7. In the exemplary embodiment, the button 7 is configured as a push button. The button 7 is provided in order to trigger a scanning process after actuation. The button 7 is disposed in a region in which the user 2 is able to actuate the button 7 with the thumb of a hand on which the user 2 is wearing the electronic garment 1.

The button 7 is electrically connected to the reading unit 6 via an electric line 8. In the exemplary embodiment, the electric line 8 leads from the button 7 to a control device, which is not shown and built into the electronic unit 4, wherein the control device is electrically connected to the reading unit 6, the display 5 and the like, and electronically controls the electronic garment 1.

Due to the connection by means of an electric line 8, it can be ensured that the electrical signals arrive without error at the control device. Thus, erroneous activations and non-activations are largely prevented, in contrast to wireless systems, for example. Thus, the device is very easy to use.

It may also be remarked that (preferably also at the same position in space and, if necessary, also in a positionally variable manner) another sensor, e.g. a proximity sensor, may also be provided instead of the button shown.

It may either be positioned and set in such a way that it reacts when a finger of the user, for example their thumb, approaches it, so that the user can trigger it with a certain, most frequently "brief" finger movement. Alternatively, the proximity sensor may be positioned and set in such a way that it recognizes—for example, in the direction across the back of the hand—whether the hand approaches a (larger) item and then automatically triggers or brings the scanner into operational mode.

Alternatively, a light barrier, for example, may be used in the same sense.

In some cases, a sensor is used, which recognizes, for example, the user making a first at all or in a certain manner and then triggering, in the above-mentioned sense. A sensor capable of being taught, e.g. by the user, can also be used for this purpose.

In this exemplary embodiment, the electronic unit 4 comprises a Bluetooth or, for example ZigBee communications module, which is not shown in the Figures and is controlled, in particular, by the control device. Thus, a corresponding connection with an external workstation not shown in the Figures can be established.

The electronic garment 1 is configured in the form of a smart watch and/or can be coupled to such a watch, wherein substantially the reading unit 6 is coupled with the smart watch.

FIG. 1 shows the electronic garment 1 in a working position 9. In the working position 9, the electronic unit 4 is firmly connected to the textile element 3.

FIG. 2 shows the electronic garment 1 in a pause position 10. In the pause position 10, the electronic unit 4 is separated from the textile element 3. In the pause position 10, the user 2 is unable to use the electronic unit 4, particularly the reading unit 6. However, the user 2 may carry out other activities in the pause position 10, e.g. mount the previously scanner component on the vehicle to be produced. The switch from the pause position 10 (FIG. 2) into the working position 9 (FIG. 1) and back may be carried out multiple times.

A loop strip 11 shown in FIG. 3 is provided for this purpose, which is firmly connected (in the exemplary embodiment, sewn) to the textile element 3. In another exemplary embodiment, the loop strip 11 may also be glued to the textile element 3. In another exemplary embodiment, the loop strip 11 may also be configured integrally with the textile element 3. Preferably, the loop strip is given a multi-part configuration and then sewn or glued to the glove.

In the region of the back of the hand, the loop strip 11 is firmly connected to the textile element 3. A hook strip 12, alternatively also a sling strip, is disposed on the underside of the electronic unit 4. In the working position 9 (FIG. 1), the hook strip 12 hooks into the loop strip 11, whereby the electronic unit 4 is firmly connected to the textile element 3. Colloquially, this is known as a "hook-and-loop fastener". It goes without saying that, in another exemplary embodiment, the hook strip 12 may be disposed on the textile element 3 and the loop strip 11 on the electronic unit 4, with the function of the "hook-and-loop fastener" functioning without restriction also in this exemplary embodiment.

A tab 13 is provided for detaching the electronic unit 4 from the textile element 3, i.e. for switching the working position 9 (FIG. 1) into the pause position 10 (FIG. 2). The tab 13 is disposed on the side of the electronic unit 4 opposite the side on which the button 7 is disposed. In the exemplary embodiment, the tab 13 is disposed on the side of the electronic unit 4 which points away from the thumb in the working position 9 (FIG. 1). The tab 13 is provided for grasping. The user grasps the tab 13 and is able to simply and easily detach the electronic unit 4 from the textile element 3 with it. In the exemplary embodiment, no hooks are provided on the hook strip 12 in the region of the tab 13, so that the tab 13 does not adhere directly to the loop strip. In another exemplary embodiment, however, it may be provided that hooks are also provided on the tab 13 so that the tab 13 adheres to the loop strip 11 and is not able to move substantially freely, so that the electronic unit is inadvertently detached.

FIG. 4 shows a part of the electronic unit 4. The electronic unit 4 includes a housing 14. The display 5 shown in FIG. 1, which is screwed to the housing 14, is not shown in FIG. 4. The electronic unit shown in FIG. 4 includes a cover layer 15 and a flexible circuit board 16, also referred to as a Flex-PCB (printed circuit board). The button 7 is disposed on the flexible circuit board 16, and the electrical line 8 runs in the flexible circuit board 16. The hook strip 12 is disposed on the underside of the flexible circuit board 16. In the exemplary embodiment, the hook strip 12 is configured to be integral with the flexible circuit board 16.

The extent of the flexible circuit board between its large surface, which rests against the underside of the housing 14, is worth noting.

The part of the flexible circuit board leading away from the large surface branches off from the large surface—preferably from one of the corners. It now forms a narrow path which is smaller, compared to the large surface, by a factor of 5 to 12, with a width of mostly about 8 mm to 15 mm. Generally, this path first runs at a distance along a lateral edge of the large surface. On the other corner, or in the vicinity thereof, the path describes an arc in order to then preferably lead outwards, away from the large surface, for example in the direction of the diagonal of the large surface.

Most frequently, an arc in the opposite direction to the aforementioned arc is provided at the end thereof. Then, the path expands and there forms a surface expanded in comparison with the previous path, most frequently substantially in the shape of a square or rectangle. The expansion of the path forms a base with sufficient room for a switch and its protective devices. The other aforementioned layers follow this extent and this shape of the flexible circuit board. The advantage of this particular extent is that the switch can be positioned in a particularly ergonomic manner and, for all that, also provides the user with a capability for altering the position—particularly in combination with the above-described hook-and-loop connection.

The flexible circuit board 16 is glued to the cover layer 15. In particular, the cover layer 15 is provided in order to protect the electric elements, such as the button 7 or the electric line 8, mounted on the flexible circuit board 16, particularly against dirt or damage.

The flexible circuit board 16 with the cover layer 15 glued thereon is screwed to the housing 14 by means of at least one screw 17, and by means of at least three in the exemplary embodiment. Wear parts, for example the flexible circuit board 16 with the cover layer 15, the housing 14, the display 5 etc. are easily replaceable due to this structure.

FIG. 5 shows an oblique view from above of the flexible circuit board 16 with the cover layer 15 glued thereto, wherein the flexible circuit board 16 and the cover layer 15 have approximately the same shape in a top view. The flexible circuit board 16 substantially has an approximately rectangular shape, which in the exemplary embodiment has the approximate shape of a square. The edge length of the square is about 5 cm, wherein other edge lengths in the range of up to 10 cm, in particular of up to 8 cm, advantageously of up to 6 cm, particularly advantageously of up to 4 cm and preferably of up to 2 cm can be provided. The edge length is at least about 1 cm, preferably at least about 3 cm, advantageously at least about 4 cm. Of course, in the case of a rectangle instead of a square, the edge lengths may be different, but lie within the above-mentioned range.

The tab 13 protrudes from an edge of the square or rectangle and is itself configured in a rectangular shape. The edge length of the rectangle of the tab 13 is connected to the main surface of the flexible circuit board 16, and is about half, preferably about one third of the edge length of the main surface. The approximately perpendicularly protruding edge length of the rectangle of the tab 13 is about one quarter, preferably about one fifth of the edge length of the main surface.

The flexible circuit board 16 extends, with an arm 18, from one corner of the main surface of the flexible circuit board 16, in the exemplary embodiment from the corner which is located towards the right and the rear in the working position 9 (FIG. 1) and which is spaced apart from the fingers and faces towards the thumb, with the button 7 being disposed on the end of the arm 18. The arm 18 has a width of at most about 2 cm, preferably at most about 1 cm.

The arm 18 is provided so that the button 7 can be flexibly shifted from the home position of the display 5 into the operating position 20, as shown in FIG. 6. FIG. 6 shows a target position 19 of the button 7 on the hand. The target position 19 is in the region of the back of the hand. The button 7 may be attached to the textile element 3 at an operating position 20. The operating position 20 is schematically shown in FIG. 6 using arrows. The operating position 20 is located within a range of approximately +/−8 mm, preferably +/−12 mm, advantageously +/−4 mm from the target position 19 on the textile element 3. The button 7, in the operating position 19, is disposed on the hand in such a way that it can be operated with at least one finger, in particular with the thumb, of the same hand.

In another exemplary embodiment, the flexible circuit board 16 may also be non-flexible, wherein at least the arm 18 has to be flexible in this case.

In another exemplary embodiment, the button 7 may also be connected to the control device via a cable. In this example, the button 7 is not disposed on the flexible circuit board 16. Also in this exemplary embodiment, however, the button 7 can be flexibly arranged and can be moved from the target position 19 to the operating position 20. Expediently, a small hook strip is attached to the button 7 in this exemplary embodiment, so that the button 7 can be attached to the loop strip 11.

FIGS. 7 to 9 show a part of a housing 21 of the electronic unit 4, which is preferably made from plastic. Specifically, FIGS. 7 to 9 show the lower part of the housing 21. As is easily apparent from FIG. 9, the housing 21 encloses an inner space in which the reading unit 6 is disposed. The housing 21 includes a housing bottom, or bottom 22 in short. The reading unit 6 is attached to a contact surface 23 disposed on the bottom 22 of the housing 21. Two contact surfaces 23 are provided in the exemplary embodiment according to FIGS. 7 to 9. The contact surfaces 23, which are also referred to as support surfaces, are integrally connected to, in particular integrally configured with, the bottom 22 via a wall 24.

The wall thickness of the wall 24 is thinner than the wall thickness of the adjacent contact surface 23 and thinner than the wall thickness of the adjacent bottom 22. This makes it possible for the contact surface 23 to be mounted on the bottom 22 in a floating and/or resilient manner.

As can be very easily seen in FIGS. 7 and 8, the wall 24 completely encloses the support surface 23. In particular, the wall 24 encloses the support surface in an oval shape; in another embodiment, the enclosure may also be circular, elliptic or the like; ideally it is rounded, without corners, which reinforces the desired resilient effect because the enclosure formed by the wall 24 is then capable of moving in a resilient manner, similar to a rolling diaphragm.

FIG. 7 indicates that the support surface 23 is offset from the outer side of the bottom 22. In other words, the outer surface of the bottom 22 and of the support surface 23 are not located in a single plane. In particular, the outer surface of the support surface 23 lies in a plane disposed closer to the inner space of the housing 21 than the plane of the outer surface of the bottom 22. The outer side of the bottom 22 is in this case the side that is disposed on the outer side of the housing 21, i.e. the side that can be seen well in FIG. 7 and which is not visible in FIGS. 8 and 9 because it is behind the plane of the page.

In order to make a floating/resilient mounting of the reading unit 6 possible, a distance, as it is indicated in FIG. 9, is provided between the reading unit 6 and the bottom 22. The reading unit 6 firmly connected to the contact surface 23 is thus mounted without any contact with the bottom 22 and operatively connected to the bottom 22 only via the wall 24. A distance of about 0.2 mm is provided between the bottom 22 and the reading unit 6, wherein it may be expedient if the distance is at least about 0.1 mm, and in particular at most about 1 mm, preferably at most about 0.5 mm.

A bore 25, which is shown in FIG. 8, is provided in the support surface 23. The bore 25 connects the outer side of the housing 21 with the inside of the housing 21. Thus, the bore 25 connects the inner space of the housing 21 with the outer space of the housing 21. The reading unit 6 is firmly screwed to the support surface 23 by means of a fastening screw 26, which is led through the bore 25 and shown in FIG. 7. Preferably, a hexagonal screw is provided as the fastening screw 26. The support surface 23 has a positioning pin 27, which protrudes into the interior of the housing 21 and is shown in FIG. 8. In the exemplary embodiment, the positioning pin 27 is configured as a dowel pin. The positioning pin 27 positions the reading unit 6 on the support surface 23 and thus serves substantially for aligning the reading unit 6 very exactly and quickly during the mounting of the electronic unit 4. This is particularly useful because the electronic unit has a water protection rating of IP65 or better.

The electronic unit 4 comprises an at least triple-layered button pad 28, which is shown in FIGS. 10 to 14. A lower layer 29 of the button pad 28 comprises the hook strip 12. A middle layer 30 of the button pad 28 comprises a flexible circuit board 16. In another embodiment of the invention, the middle layer 30 corresponds to the circuit board 16, i.e. is formed integrally. In another embodiment of the invention, the middle layer 30 may also be configured as a carrier layer for the circuit board 16, wherein the circuit board 16 and the middle layer 30 are in this case firmly connected to each other. The circuit board 16, or the middle layer 30, are electrically connected to the trigger 7. An upper layer, in particular the cover layer 31, of the button pad 28 seals the button pad 28, wherein the middle layer 30 is disposed between the lower layer 29 and the cover layer 31.

The upper layer comprises a cut-out 32 for the trigger 7, which is shown in FIG. 10 and most frequently window-like. In that case, a cap 33 in the shape of a housing-like depression is most frequently disposed above the cut-out 32 of the upper layer, as can be easily seen in FIG. 10 and primarily in FIG. 13. The majority of the trigger 7 is disposed in the cap 33; in particular, the trigger 7 is enclosed at least partially by at least the lower layer 29, the upper layer and the cap 33. As a result, the cap 33 protects the trigger 7, particularly against mechanical impacts. For this purpose, the cap 33 is configured in a massive manner, i.e. in a single piece and from a solid, hard plastic.

In order for the trigger 7 to be operable by the operator, the cap 33 has an, in particular central, bore 34, which is disposed on the outer side of the cap 33 facing away from the upper layer and depicted in FIGS. 10 and 13. In the assembled state of the pad 28, a button 35 of the trigger 7 protrudes from the bore 34, so that the user 2 can actuate the button 35 of the trigger 7. The protrusion can be easily seen in FIGS. 13 and 14.

In the exemplary embodiment, the cap 7 is glued to the upper layer. In the exemplary embodiment, the lower layer 29 is also glued to the middle layer 30, and the middle layer 30 to the upper layer. Alternatively, a different type of connection may of course also be chosen, e.g. sewing, welding or the like. In the exemplary embodiment, the adhesive is, or consists to a substantial extent of, cyanoacrylate, in particular ethyl cyanoacrylate. The use of an adhesive of the type LOCTITE® 480™ is ideal. All of the technical, in particular physical and chemical, data of the type LOCTITE® 480™ are part of this exemplary embodiment. Due to its characteristic chemical and physical properties, this adhesive has proved to be very advantageous both with respect to producing the pad 28 and with respect to the long-term durability of the finished pad 28.

The actuation of the trigger 7 requires an actuating force F, which is indicated in FIG. 13, of no more than about 10 N, in particular no more than about 5 N, particularly advantageously of no more than about 3.5 N; the trigger is designed accordingly. The trigger 7 is further characterized in that the trigger 7, particularly the button 35, can be actuated at least about 10,000 times, in particular at least about 100,000 times, preferably at least about 1,000,000 times, particularly preferably at least about 2,000,000 times, without any adverse effect on the function in the meantime.

In the exemplary embodiment, the trigger 7, in particular the button 35, has a key travel of about 1 mm at most, preferably about 0.5 mm at most, particularly preferably about 0.3 mm at most. Key travel means the movement running approximately parallel to the actuating force F shown in FIG. 13. In this case, key travel is the maximum distance that the button 35 can be moved when pressed by the user. In that case, the button 35 triggers an electrical signal after the button 35 has been moved by the key travel. The button 35 is configured in the form of an, in particular round, actuating button, as can be easily seen in FIGS. 13 and 14. The trigger 35 has a diameter D of about 6 mm at most, preferably about 5 mm at most, particularly preferably about 4 mm at most. In the exemplary embodiment, the trigger 7 is configured in accordance with the design of one of the types Panasonic EVQP0, EVQQ2, EVQ6Q2 or EVQ7Q2. All technical data of the trigger according to any one of the types Panasonic EVQP0, EVQQ2, EVQ6Q2 or EVQ7Q2 are a part of this exemplary embodiment.

FIGS. 15 to 22 show a charging station 36, 37 for the electronic unit 4 and/or for the electronic unit 4 of the electronic garment 1. The charging station 36, 37 comprises a charging housing 38, wherein the charging housing 38 comprises a charging bay 39 provided for receiving the electronic unit 4.

The charging housing 38 has at least one centering projection 40 for positioning the electronic unit 4 in the charging bay 39. Two centering projections 40 are provided in the exemplary embodiment. The two centering projections 40 are diametrically opposite each other and, when the electronic unit 4 is inserted, abut against the outer walls of the housing of the electronic unit 4. The centering projections 40 protrude into the charging bay 39. The centering projections 40 are configured in a lug-like manner, as is easily apparent in FIG. 16. The free spaces created by these centering projections facilitate the quick and reliable "pick-up" of the charged electronic unit 4.

The charging bay 39 comprises a charging bottom 41 and charging walls 42. The centering projections 40 are disposed on one, in the exemplary embodiment on two, of the charging walls 42, which are, in particular, opposite each other. The charging walls 42 extend obliquely in such a manner that the distance of the charging walls 42 from each other decreases in the direction towards the charging bottom 41. As a result, the user can place the electronic unit in the charging bay 39 relatively easily, wherein the electronic unit 4 is automatically centered on the charging station 36 when the electronic unit is inserted and thus approaches the charging bottom 41.

The charging station 36 comprises a fastening device 43 for fastening the electronic unit 4.

The fastening device 43 may be configured as a bracket, particularly as a folding bracket, which is not shown in the Figures. In the exemplary embodiment, the fastening device is configured as a tension belt, in particular as a rubber band, spring pressure clip or the like.

The charging station 36, 37 includes devices 44 for inductively charging the electronic unit 4, see FIGS. 15 and 21. Expediently, the devices 44 are disposed underneath the charging bottom 41 in the interior of the housing of the charging station 36.

The charging station 36, 37 comprises at least one connecting device 45 with which the charging station 36 can be connected, in particular firmly connected, to a second charging station 36, which is, in particular, identical in construction. In a very simple embodiment, such a connecting device 45 is designed as a simple bore, as a sling or the like, to which a fastening means, such as a screw, nail, wire or the like can be fastened.

In contrast to the exemplary embodiment according to FIGS. 15 to 20, in which only one charging bay 39 per charging station 36 is provided, several charging bays 39 per charging station 37 are provided in the exemplary embodiment according to FIGS. 21 and 22. In the exemplary embodiment according to FIGS. 21 and 22, 10 charging bays 39 per charging station 37 are provided. It may be expedient to provide, in particular, at least about 2, preferably at least about 6, particularly preferably at least about 10, and in particular at most about 50, preferably at most about 20, particularly preferably at most about 16 charging bays 39 per charging station 37.

Expediently, the charging station 36, 37 can be supplied with power via a USB charging socket 46 shown in FIG. 16. Of course, a different power supply may be provided instead of the USB charging socket.

The reading unit 6 comprises a photo cell unit and a scanning unit, wherein the scanning unit is provided for scanning the surroundings, particularly the code, and wherein the photo cell unit photographs the code for further electronic processing.

The invention includes a textile element 3 shown in the Figures, in particular a glove, a hand cover, a gauntlet or the like, with a first hook-and-loop fastener member firmly connected to the textile element 3, preferably in the form of a loop strip 11, wherein an electronic unit 4 can be connected to the textile element 3 via a second hook-and-loop fastener part, preferably in the shape of a hook strip 12, attached to the electronic unit 4, wherein, in a working position 9, the hook strip 12 can be firmly connected to the loop strip 11 and thus, the electronic unit 4 can be firmly connected to the textile element 3, and wherein, in a pause position 10, the hook strip 12 can be detached from the loop strip 11 and whereby the electronic unit 4 can be separated from the textile element 3, and wherein the electronic unit 4 comprises, in particular, a reading unit 6 for reading a code, wherein the electronic unit 4 comprises, in particular, a trigger 7, wherein the trigger 7 is electrically connected to the reading unit 6 in particular via an electric line 8, and wherein, in particular, the reading unit 6 for reading the code starts upon actuation of the trigger 7.

As an exemplary embodiment, a method is provided for reading a code attached to a component by means of an electronic garment 1 according to any one of the claims 1 to 5, which comprises the following method steps:
 a) Donning the textile element 3 by a user,
 b) Connecting the electronic unit 4 to the textile element 3, in particular firmly connecting the first to the second hook-and-loop fastener part, so that the electronic garment 1 can be used in the working position 9 by the user,
 c) Reading the at least one reading code of the at least one component, wherein the user actuates the trigger 7 and thus, the reading unit 6 reads the code,
 d) If necessary, repeating the method step c) once or several times, particularly when scanning codes of several components,
 e) Detaching the electronic unit 4 from the textile element 3, so that in the pause position 10, the user is capable of working, in particular without the electronic unit 4.

It may be expedient if the user repeats the working steps b) to e) after the working step e).

It may be expedient if the user places the electronic unit 4 in the charging station 36, 37 in order to charge the electronic unit 4 after the working step e).

Expediently, the touchscreen is mounted in a floating manner on, preferably, a rubber seal which is preferably impregnated with acrylate and preferably consists of foam. Thus, the touchscreen is impact-resistant.

Expediently, the electronic unit 4 is connected in such a way that, for example, an industrial computer, e.g. in the warehouse, or a mobile phone or other portable high-performance device of the user is employed as a kind of relay station. Expediently, this device has access to a merchandise management system. In this manner, no particularly high-performance computing unit need be installed in the electronic unit 4. Apart from the communications modules, a mere display device with a small computing unit is sufficient in that case. The computing tasks are then taken over by the device, i.e. the mobile phone or the industrial computer or the like, which forwards the instructions of the central computer. Expediently, the user can input via the touchscreen that the user is located at the respective storage location to which they were sent. The user can also input whether they have picked up the merchandise or how much merchandise they have found, e.g. 5 items of merchandise instead of the requested 10 items of merchandise. Of course, the user can also scan the merchandise by means of the reading unit 6.

Internally, the electronic unit 4 is provided with a SIPO battery. This battery expands by up to 10% in volume when charging. Therefore, a correspondingly dimensioned accommodation space is provided for it in the housing, which retains the battery in a rattle-proof manner but does not, or not substantially, impede its volume expansion, which occurs during charging. Often, it makes sense to suppress the rattling of the battery in the accommodation space, for example, by also placing a compressible mat, e.g. consisting of foamed material, in the accommodation space.

The battery lasts for about 500 charging cycles. The housing of the electronic unit 4 can be opened for replacing the battery. Expediently, the electrical terminals of the battery are provided with plug-in connectors. It may also be expedient if the electrical terminals of the battery can be solder-connected.

The electronic unit 4 satisfies at least protection class IP65.

Irrespective of the claims, protection is also sought for the items and methods described in the following paragraphs, wherein the next paragraph constitutes paragraph 1, and the subsequent paragraphs are numbered in order.

An electronic garment 1 with a textile element 3, in particular a glove, a hand cover, a gauntlet or the like, and with a first hook-and-loop fastener member firmly connected to the textile element 3, preferably in the form of a loop strip 11, and with an electronic unit 4, wherein the electronic unit 4 comprises a reading unit 6 for reading a code, wherein the electronic unit 4 comprises a trigger 7, wherein the trigger 7 is electrically connected to the reading unit 6 via an electric line 8, wherein the reading unit 6 for reading the code starts upon actuation of the trigger 7, wherein the electronic unit 4 comprises a second hook-and-loop fastener part, preferably in the shape of a hook strip 12, wherein, in a working position 9, the hook strip 12 is firmly connected to the loop strip 11 and thus, the electronic unit 4 is firmly connected to the textile element 3, and wherein, in a pause position 10, the hook strip 12 is detached from the loop strip 11 and thus, the electronic unit 4 is separated from the textile element 3.

The electronic garment 1 according to paragraph 1, characterized in that the loop strip 11 consists of a textile.

The electronic garment 1 according to paragraph 1 or 2, characterized in that the loop strip 11 is sewn and/or glued to the textile element 3.

The electronic garment 1 according to paragraph 1, 2 or 3, characterized in that the loop strip 11 consists of at least two separate parts, which are both attached, preferably sewn and/or glued, to the textile element 3.

The electronic garment 1 according to paragraph 1, 2 or 3, characterized in that the loop strip 11 and the textile element 3 are configured in an integral manner, in particular, that the textile element 3 is configured as a loop strip 11.

The electronic garment 1 according to any one of the paragraphs 1 to 5, characterized in that, when the textile element 3 is worn on a hand of a user 2, the loop strip 11 is disposed approximately in the region of the back of the hand, and that, particularly in the working position 9, when the textile element 3 is worn, the electronic unit 4 is disposed in the region of the back of the hand.

The electronic garment 1 according to any one of the paragraphs 1 to 6, characterized in that the hook strip 12 is disposed on a flexible circuit board 16, which generally protrudes outwards from the housing 14.

The electronic garment 1 according to paragraph 7, characterized in that the hook strip 12 is integrally configured with the flexible circuit board 16.

The electronic garment 1 according to paragraph 7 or 8, characterized in that the trigger is disposed on the flexible circuit board 16, and that the electric line 8 leads from the button 7 via the flexible circuit board 16 to a control device in the electronic unit 4.

The electronic garment 1 according to any one of the paragraphs 1 to 9, characterized in that the electronic unit 4 comprises a housing 14, a cover layer 15, a flexible circuit board 16 or at least two discrete cables and the hook strip 12.

The electronic garment 1 according to paragraph 10, characterized in that the hook strip 12 is glued or welded to the cover layer 15.

The electronic garment 1 according to paragraph 10 or 11, characterized in that the hook strip 12 is screwed to the housing 14, and preferably with its underside of the housing 14, which faces towards the back of the hand of the wearer in the intended position.

The electronic garment 1 according to paragraph 12, characterized in that the flexible circuit board 16 is simultaneously brought into electrical contact with the housing 14 by means of the screws 17 mechanically connecting it to the housing 14.

The electronic garment 1 according to any one of the paragraphs 1 to 13, characterized in that the hook strip 12 includes a tab 13, which is provided for detaching the electronic unit 4 from the textile element 3.

The electronic garment 1 according to paragraph 14, characterized in that the tab 13 is free of hooks.

The electronic garment 1 according to any one of the paragraphs 1 to 15, characterized in that the button 7 is disposed at a target position 19 in the region of the back of the hand.

The electronic garment 1 according to paragraph 16, characterized in that the button 7 can be attached at different operating positions 20 on the textile element 3 without any tools by the user 2 themselves, ideally in such a way that the operating position 20 is located within a range of approximately +/−8 mm from the target position 19 on the textile element 3.

The electronic garment 1 according to any one of the preceding paragraphs, characterized in that the button 7, in the operating position 20, is disposed on the hand in such a way that it can be operated with at least one finger, in particular with the thumb, of the same hand, ideally by the thumb being moved towards the middle finger and operating the button 7 with its edge.

The electronic garment 1 according to any one of the paragraphs 1 to 18, characterized in that the reading unit 6 includes a barcode scanner.

The electronic garment 1 according to any one of the paragraphs 1 to 18, characterized in that the reading unit 6 includes an RFID scanner.

The electronic garment 1 according to any one of the paragraphs 1 to 19, characterized in that the electronic unit 4 includes a display 5 for displaying information, e.g. for displaying a successful or unsuccessful scanning process, for displaying the scanned product or the like.

The electronic garment 1 according to any one of the paragraphs 1 to 20, characterized in that the electronic unit 4 includes an input unit, in particular a touchscreen, for inputting information, in particular for inputting standardized processes or the like.

The electronic garment 1 according to any one of the paragraphs 1 to 21, characterized in that the electronic unit 4 includes a Bluetooth communications module or an ISM or SRD communications module, preferably on the 868 MHz band or the 915 MHz band, with which, in particular, a Bluetooth connection or an ISM or SRD connection can be established with an external workstation.

The electronic garment 1 according to any one of the paragraphs 1 to 22, characterized in that the electronic unit 4 is configured in the form of a smart watch.

The electronic garment 1 according to any one of the paragraphs 1 to 23, characterized in that the textile element 3 is configured to be free of electronics.

An electronic unit 4, in particular as a component of the electronic garment 1 according to any one of the paragraphs 1 to 25, with a reading unit 6 for reading a code, wherein the electronic unit 4 comprises a trigger 7, wherein the trigger 7 is electrically connected to the reading unit 6 via an electric line 8, wherein the reading unit 6 for reading the code starts upon actuation of the trigger 7, wherein the electronic unit 4 comprises a second hook-and-loop fastener part, preferably in the shape of a hook strip 12, wherein the second hook-and-loop fastener part can be connected via a first hook-and-loop member, preferably in the form of a loop strip 11, which is firmly connected to a textile element 3, in particular a glove, hand cover, gauntlet or the like, so that, in a working position 9, the hook strip 12 can be firmly connected to the loop strip 11 and thus, the electronic unit 4 can be firmly connected to the textile element 3, and wherein, in a pause position 10, the hook strip 12 can be detached from the loop strip 11 and thus, the electronic unit 4 can be separated from the textile element 3.

The electronic unit according to paragraph 26, characterized in that the reading unit 6 comprises a photo cell unit and a scanning unit, wherein the scanning unit is provided for scanning the surroundings, particularly the code, and wherein the photo cell unit photographs the code for further electronic processing.

The electronic unit according to paragraph 26 or 27, characterized in that the electronic unit 4 made, in particular, from plastic, comprises a housing 21, wherein the reading unit 6 is disposed, in particular, within the housing 21, and wherein the housing 21 comprises a bottom 22, and wherein the reading unit 6 is firmly connected to a contact surface 23 disposed on the bottom 22 of the housing 21, and wherein the contact surface 23 is mounted on the bottom 22 in a floating and/or resilient manner.

The electronic unit according to paragraph 28, characterized in that the contact surface 23 and the bottom 22 are configured integrally.

The electronic unit according to paragraph 28 or 29, characterized in that the bottom 22 and the support surface 23 are connected via a wall 24, wherein the wall thickness of the wall 24 is thinner than the wall thickness of the bottom 22, and thinner than the wall thickness of the support surface 23, so that the wall surface 24 enables the floating and/or resilient mounting of the support surface 23 on the bottom 22.

The electronic unit according to paragraph 30, characterized in that the wall 24 completely encloses the support surface 23, in particular, the wall 24 surrounds the support surface 23 in an oval, circular, elliptical or similar shape.

The electronic unit according to any one of the paragraphs 28, to 31, characterized in that the support surface 23 is offset from the outer side of the bottom 22, wherein the outer side of the bottom 22 is the side disposed on the outer side of the housing 21.

The electronic unit according to any one of the paragraphs 28 to 32, characterized in that the reading unit 6 firmly connected to the contact surface 23 is mounted without any contact with the bottom 22, wherein a distance, particularly a distance of at least about 0.1 mm, preferably at least about 0.2 m, and in particular at most about 1 mm, preferably at most about 0.5 mm, is provided between the bottom 22 and the reading unit 6.

The electronic unit according to any one of the paragraphs 28 to 33, characterized in that a bore 25 is provided in the support surface 23, wherein the bore 25 connects the outer side of the housing 21 with the inside of the housing 21, wherein the reading unit 6 is firmly screwed to the support surface 23 by means of a fastening screw 26, which is led through the bore 25.

The electronic unit according to any one of the paragraphs 28 to 34, characterized in that the support surface 23 has a positioning pin 27, which protrudes into the interior of the housing 21, wherein the positioning pin 27, which is configured in particular as a dowel pin, positions the reading unit 6 on the support surface 23.

The electronic unit according to any one of the paragraphs 28 to 35, characterized in that the electronic unit 4 comprises an at least triple-layered button pad 28, wherein a lower layer 29 of the button pad 28 comprises the hook strip 12, wherein a middle layer 30 of the button pad 28 comprises a flexible circuit board 16 electrically connected to the trigger 7, wherein an upper layer, particularly a cover layer 31, of the button pad 28 seals the button pad 28, wherein the middle layer 30 is disposed between the lower layer 29 and the upper layer.

The electronic unit according to paragraph 36, characterized in that the upper layer comprises a cut-out 32 for the trigger 7, wherein a cap 33 in the shape of a housing-like depression is disposed above the cut-out 32 of the upper layer, and that the trigger 7 is disposed in the cap 33, in particular, that the trigger 7 is enclosed, at least in part, at least by the lower layer 29, the upper layer and the cap 33.

The electronic unit according to paragraph 37, characterized in that the cap 33 has a, in particular central, bore 34, which is disposed on the outer side of the cap 33 facing away from the upper layer, wherein a button 35 of the trigger 7 protrudes from the bore 34, so that the user 7 can actuate the button 35 of the trigger 7.

The electronic unit according to paragraph 37 or 38, characterized in that the cap 7 is massive.

The electronic unit according to any one of the paragraphs 37 to 39, characterized in that the cap 7 is glued to the upper layer.

The electronic unit according to any one of the paragraphs 36 to 40, characterized in that the lower layer 29 is glued to the middle layer 30 and/or the middle layer 30 to the upper layer.

The electronic unit according to any one of the paragraphs 40 or 41, characterized in that the adhesive includes cyanoacrylate, in particular ethyl cyanoacrylate, and is of the type LOCTITE® 480™, for example.

The electronic unit according to any one of the paragraphs 26 to 42, characterized in that the actuation of the trigger 7 requires an actuating force of no more than about 10 N, in particular no more than about 5 N, particularly advantageously of no more than about 3.5 N.

The electronic unit according to any one of the paragraphs 26 to 43, characterized in that the trigger 7 can be actuated at least about 10,000 times, in particular at least about 100,000 times, preferably at least about 1,000,000 times, particularly preferably at least about 2,000,000 times.

The electronic unit according to any one of the paragraphs 26 to 44, characterized in that the trigger 7 has a key travel of about 1 mm at most, preferably about 0.5 mm at most, particularly preferably about 0.3 mm at most.

The electronic unit according to any one of the paragraphs 26 to 45, characterized in that the trigger 7 includes a button 35 in the form of an, in particular round, actuating button, wherein the button 35 has a diameter of at most about 6 mm, preferably of at most about 5 mm, particularly preferably of at most about 4 mm.

The electronic unit according to any one of the paragraphs 26 to 46, characterized in that the trigger 7 is configured in accordance with one of the types Panasonic EVQP0, EVQQ2, EVQ6Q2 or EVQ7Q2.

A charging station for an electronic unit 4 according to any one of the paragraphs 26 to 47 and/or for an electronic unit 4 of an electronic garment 1 according to any one of the paragraphs 1 to 25, characterized in that the charging station 36, 37 comprises a charging housing 38, wherein the charging housing 38 comprises a charging bay 39 provided for receiving the electronic unit 4.

The charging station according to paragraph 48, characterized in that the charging housing 38 has at least one centering projection 40 for positioning the electronic unit 4 in the charging bay 39.

The charging station according to paragraph 49, characterized in that the centering projection 40 protrudes into the charging bay 39 and is configured, in particular, in a lug-like manner.

The charging station according to paragraph 49 or 50, characterized in that the charging bay 39 comprises a charging bottom 41 and charging walls 42, wherein the centering projection 40 is disposed on one of the charging walls 42.

The charging station according to any one of the paragraphs 48 to 51, characterized in that the charging station 36 comprises a fastening device 43 for fastening the electronic unit 4.

The charging station according to paragraph 52, characterized in that the fastening device 43 is configured as a bracket, particularly as a folding bracket, or as a tension belt, in particular as a rubber band, spring pressure clip or the like.

The charging station according to any one of the paragraphs 48 to 53, characterized in that the charging station 36, 37 includes devices 44 for inductively charging the electronic unit 4.

The charging station according to any one of the paragraphs 48 to 54, characterized in that the charging station 36 comprises at least one connecting device 45 with which the charging station 36 can be connected, in particular firmly connected, to a second charging station 36, which is, in particular, identical in construction.

The charging station according to any one of the paragraphs 48 to 54, characterized in that the charging station 37 has several, in particular at least about 2, preferably at least about 6, particularly preferably at least about 10, and in particular at most about 50, preferably at most about 20, particularly preferably at most about 16 charging bays 39.

A textile element 3, in particular a glove, a hand cover, a gauntlet or the like, with a first hook-and-loop fastener member firmly connected to the textile element 3, preferably in the form of a loop strip 11, wherein an electronic unit 12 can be connected to the textile element 3 via a second hook-and-loop fastener part, preferably in the shape of a hook strip 12, attached to the electronic unit 12, wherein, in a working position 9, the hook strip 12 can be firmly connected to the loop strip 11 and thus, the electronic unit 4 can be firmly connected to the textile element 3, and wherein, in a pause position 10, the hook strip 12 can be detached from the loop strip 11 and thus, the electronic unit 4 can be separated from the textile element 3, and wherein the electronic unit 4 comprises, in particular, a reading unit 6 for reading a code, wherein the electronic unit 4 comprises, in particular, a trigger 7, wherein the trigger 7 is electrically connected to the reading unit 6 in particular via an electric line 8, and wherein, in particular, the reading unit 6 for reading the code starts upon actuation of the trigger 7.

A method for reading a code attached to a component by means of an electronic garment 1 according to any one of the paragraphs 1 to 25, comprising the following method steps:

a) Donning the textile element 3 by a user, b) Connecting the electronic unit 4 to the textile element 3, in particular firmly connecting the first to the second hook-and-loop fastener part, so that the electronic garment 1 can be used in the working position 9 by the user, c) Reading the at least one reading code of the at least one component, wherein the user actuates the trigger 7 and thus, the reading unit 6 reads the code, d) If necessary, repeating the method step c once or several times, particularly when scanning codes of several components, e) Detaching the electronic unit 4 from the textile element 3, so that in the pause position 10, the user is capable of working, in particular without the electronic unit 4. The method according to paragraph 58, characterized in that the user repeats the working steps b to e after the working step e.

The method according to paragraph 58 or 59, characterized in that the user places the electronic unit 4 in a charging station 36, 37 according to any one of the paragraphs 48 to 56, in order to charge the electronic unit 4 after the working step e.

The invention claimed is:

1. An electronic garment that is worn by a user, comprising:

a textile element with a first hook-and-loop fastener member firmly connected to the textile element, and an electronic unit comprising a reading unit for reading a code, and a trigger that is electrically connected to the reading unit via an electric line, wherein the trigger is a push button and the reading unit for reading the code comprises a photo cell and at least one scanner, and the reading unit starts upon actuation of the trigger, wherein the electronic unit further comprises a button pad with a flexible circuit board electrically connected to the trigger, and the push button is disposed on an arm of the flexible circuit board that branches off from a main surface of the flexible circuit board, wherein the arm forms a narrow path that is smaller in width than a width of the main surface by a factor of 5 to 12, the narrow path running at a distance along a lateral edge of the main surface and curving outwards away from the main surface, with the electric line integrated in the flexible circuit board, and wherein the electronic unit further comprises a second hook-and-loop fastener part at least partially arranged on an underside of the trigger, wherein, in a working position of the electronic garment, the second hook-and-loop fastener part is firmly connected to the first hook-and-loop fastener member and thus, the electronic unit is firmly connected to the textile element with a position of the trigger fixed in a working position, and wherein, in a pause position of the electronic garment, the second hook-and-loop fastener part is detached from the first hook-and-loop fastener member and thus, the electronic unit is separated from the textile element, and wherein the trigger in the working position is disposed in a region in which the user is able to actuate the trigger with a thumb of a hand on which the user is wearing the electronic garment.

2. The electronic garment according to claim 1, wherein, when the textile element is worn on a hand of a user, the first hook-and-loop fastener member is disposed approximately in a region of a back of the hand, and when the textile element is worn, the electronic unit is disposed in the region of the back of the hand.

3. The electronic garment according to claim 1, wherein the trigger is disposed at a target position on the textile element in a region of a back of a hand of a user.

4. The electronic garment according to claim 3, wherein the trigger can be attached at different operating positions on the textile element without any tools by the user themselves, in such a way that the operating position is located within a range of approximately +/−8 mm from the target position on the textile element.

5. The electronic garment according to claim 1, wherein the trigger, in an operating position, is disposed on a hand of a user in such a way that the trigger can be operated with at least one finger of the same hand.

6. The electronic garment according to claim 1, wherein at an end of the arm of the flexible circuit board, the narrow path widens to accommodate the push button.

7. An electronic unit, as a component of the electronic garment according to claim 1, comprising the reading unit for reading a code, and the trigger that is electrically connected to the reading unit via the electric line, wherein the reading unit for reading the code starts upon actuation of the trigger, and wherein the electronic unit further comprises the second hook-and-loop fastener part.

8. The electronic unit according to claim 7, wherein the electronic unit, made from plastic, comprises a housing, wherein the reading unit is disposed within the housing, and wherein the housing comprises a bottom, and wherein the reading unit is firmly connected to a contact surface disposed on the bottom of the housing, and wherein the contact surface is mounted on the bottom in a floating manner, a resilient manner, or a floating and resilient manner.

9. The electronic unit according to claim 8, wherein the reading unit firmly connected to the contact surface is mounted without any contact with the bottom, and a distance of at least about 0.1 mm is provided between the bottom and the reading unit.

10. The electronic unit according to claim 8, further comprising an at least triple-layered button pad, wherein a lower layer of the button pad comprises the second hook-and-loop fastener part, a middle layer of the button pad comprises a flexible circuit board electrically connected to the trigger, an upper layer of the button pad seals the middle layer between the lower layer and the upper layer.

11. The electronic unit according to claim 10, wherein the upper layer comprises a cut-out for the trigger, wherein a cap in a shape of a housing-like depression is disposed above the cut-out of the upper layer, and the trigger is disposed in the cap, with the trigger enclosed, at least in part, at least by the lower layer, the upper layer and the cap.

12. A charging station for the electronic unit according to claim 1, wherein the charging station comprises a charging housing, and the charging housing comprises a charging bay provided for receiving the electronic unit.

13. The charging station according to claim 12, wherein the charging station comprises a fastening device for fastening the electronic unit, and the fastening device is configured as a bracket or a tension belt.

14. A method for reading a code attached to a component by means of an electronic garment according to claim 1, comprising the following method steps:
 a) donning the textile element by a user,
 b) connecting the electronic unit to the textile element by firmly connecting the first hook-and-loop fastener member to the second hook-and-loop fastener part, so that the electronic garment can be used in the working position by the user,
 c) reading the at least one reading code, wherein the user actuates the trigger and thus, the reading unit reads the code,
 d) if necessary, repeating the method step c) once or several times, and
 e) detaching the electronic unit from the textile element, so that in the pause position, the user is capable of working without the electronic unit.

15. A textile element selected from the group consisting of a glove, a hand cover, and a gauntlet, comprising:
 a first hook-and-loop fastener member firmly connected to the textile element;
 an electronic unit that can be connected to the textile element via a second hook-and-loop fastener part, wherein, in a working position of the textile element, the second hook-and-loop fastener part can be firmly connected to the first hook-and-loop fastener member and thus, the electronic unit can be firmly connected to the textile element, and wherein, in a pause position of the textile element, the second hook-and-loop fastener part can be detached from the first hook-and-loop fastener member and thus, the electronic unit can be separated from the textile element, and wherein the electronic unit comprises a reading unit for reading a code, a push-button trigger that is electrically connected to the reading unit via an electric line, and a button pad with a flexible circuit board electrically connected to the push-button trigger, with the push-button trigger disposed on an arm of the flexible circuit board that branches off from a main surface of the flexible circuit board, wherein the arm forms a narrow path that is smaller in width than a width of the main surface by a factor of 5 to 12, the narrow path running at a distance along a lateral edge of the main surface and curving outwards away from the main surface, with the electric line integrated in the flexible circuit board, and wherein the reading unit for reading the code starts upon actuation of the push-button trigger.

16. The textile element according to claim 15, wherein at an end of the arm of the flexible circuit board, the narrow path widens to accommodate the push button.

17. An electronic, as a component of an electronic garment, comprising:
 a textile element with a first hook-and-loop fastener member firmly connected to the textile element, and
 an electronic unit comprising a reading unit for reading a code, and a trigger that is electrically connected to the reading unit via an electric line, wherein the reading unit for reading the code comprises a photo cell and at least one scanner, and the reading unit starts upon actuation of the trigger, wherein the electronic unit further comprises a second hook-and-loop fastener part,
 wherein, in a working position of the electronic garment, the second hook-and-loop fastener part can be firmly connected to the first hook-and-loop fastener member and thus, the electronic unit can be firmly connected to the textile element, and wherein, in a pause position of the electronic garment, the second hook-and-loop fastener part can be detached from the first hook-and-loop fastener member and thus, the electronic unit can be separated from the textile element,
 wherein the electronic unit, made from plastic, comprises a housing, wherein the reading unit is disposed within the housing, and wherein the housing comprises a bottom, and wherein the reading unit is firmly connected to a contact surface disposed on the bottom of the housing, and wherein the contact surface is mounted on the bottom in a floating or resilient manner, and
 wherein the bottom and a support surface are connected via a wall, wherein a thickness of the wall is thinner than a thickness of the bottom, and thinner than a thickness of the support surface, so that a surface of the wall enables the floating mounting, resilient mounting, or floating and resilient mounting of the support surface on the bottom.

\* \* \* \* \*